United States Patent
Shioya et al.

(10) Patent No.: US 9,996,556 B2
(45) Date of Patent: *Jun. 12, 2018

(54) MODIFICATION OF IMAGES AND ASSOCIATED TEXT

(71) Applicant: International Business Machines Corporation, Armonk, NY (US)

(72) Inventors: Tomohiro Shioya, Tokyo (JP); Masami Tada, Kanagawa (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/616,555

(22) Filed: Jun. 7, 2017

(65) Prior Publication Data

US 2017/0270142 A1  Sep. 21, 2017

Related U.S. Application Data

(63) Continuation of application No. 14/868,726, filed on Sep. 29, 2015.

(51) Int. Cl.
*G06K 9/00* (2006.01)
*G06F 17/30* (2006.01)
*G06T 11/60* (2006.01)

(52) U.S. Cl.
CPC .... *G06F 17/30268* (2013.01); *G06F 17/3028* (2013.01); *G06F 17/30259* (2013.01); *G06K 9/00671* (2013.01); *G06T 11/60* (2013.01)

(58) Field of Classification Search
CPC ......... G06F 17/30268; G06F 17/30259; G06F 17/3028
See application file for complete search history.

(56) References Cited

U.S. PATENT DOCUMENTS 5,684,999 A * 11/1997 Okamoto .......... G06F 17/30672
382/305
5,801,685 A   9/1998 Miller
(Continued)

FOREIGN PATENT DOCUMENTS

| JP | 2009081635 A | 4/2009 |
|---|---|---|
| JP | 2010165068 A | 7/2010 |
| JP | 2017068841 A | 4/2017 |

OTHER PUBLICATIONS list of IBM Patents or Patent Applications Treated as Related. Filed Jun. 7, 2017. 2 pages.

(Continued)

*Primary Examiner* — Kim Vu
*Assistant Examiner* — Molly Delaney
(74) *Attorney, Agent, or Firm* — Aaron N. Pontikos

(57) ABSTRACT

A computer-implemented method includes receiving an image. The image includes one or more objects and one or more text portions. The computer-implemented method further includes identifying the one or more objects. The computer-implemented method further includes, for each of the one or more objects identified, extracting an object tag. The computer-implemented method further includes, for each of the one or more text portions, extracting a text tag. The computer-implemented method further includes, for each text tag, determining whether the text tag describes any of the one or more objects based on the object tag extracted from each object to yield a determination. The computer-implemented method further includes, responsive to the determination: performing an image process to that of the one or more objects, and performing a text process to that of the one or more text portions. A corresponding computer program product and computer system are also disclosed.

9 Claims, 12 Drawing Sheets

(56) References Cited

U.S. PATENT DOCUMENTS

| | | | | |
|---|---|---|---|---|
| 6,826,727 | B1* | 11/2004 | Mohr | G06F 17/211 |
| | | | | 382/180 |
| 7,624,123 | B2* | 11/2009 | Bandas | G06F 17/30256 |
| 8,136,028 | B1* | 3/2012 | Loeb | G06F 17/30268 |
| | | | | 715/200 |
| 8,300,953 | B2* | 10/2012 | Lindley | G06F 17/30038 |
| | | | | 382/190 |
| 8,516,365 | B2* | 8/2013 | Hoyer | G06F 17/211 |
| | | | | 715/243 |
| 8,935,199 | B2 | 1/2015 | Roulland | |
| 9,311,568 | B1* | 4/2016 | Feller | G06K 9/6267 |
| 9,606,975 | B2* | 3/2017 | Oh | G06F 17/241 |
| 2006/0251339 | A1* | 11/2006 | Gokturk | G06F 17/30253 |
| | | | | 382/305 |
| 2008/0152231 | A1* | 6/2008 | Gokturk | G06F 17/30256 |
| | | | | 382/209 |
| 2009/0006471 | A1* | 1/2009 | Richardson | G06F 17/30265 |
| 2010/0083173 | A1* | 4/2010 | Germann | G06F 17/3012 |
| | | | | 715/810 |
| 2010/0180184 | A1* | 7/2010 | Kitamaru | G06F 17/21 |
| | | | | 715/204 |
| 2011/0161792 | A1* | 6/2011 | Florence | G06F 17/30882 |
| | | | | 715/205 |
| 2012/0075490 | A1* | 3/2012 | Tsai | G06Q 30/0241 |
| | | | | 348/222.1 |
| 2014/0025682 | A1* | 1/2014 | Okuma | G06F 17/30253 |
| | | | | 707/740 |
| 2014/0047413 | A1* | 2/2014 | Sheive | H04L 65/403 |
| | | | | 717/110 |
| 2014/0078076 | A1* | 3/2014 | Wilensky | G06T 11/60 |
| | | | | 345/173 |
| 2014/0122479 | A1* | 5/2014 | Panferov | G06F 3/0643 |
| | | | | 707/736 |
| 2014/0372467 | A1* | 12/2014 | Locker | G06F 17/30528 |
| | | | | 707/766 |
| 2015/0331929 | A1* | 11/2015 | El-Saban | G06F 17/30598 |
| | | | | 707/739 |
| 2016/0364374 | A1* | 12/2016 | O'Connor | G06F 17/30268 |
| 2017/0091224 | A1 | 3/2017 | Shioya | |

OTHER PUBLICATIONS

Shioya et al., "Modification of Images and Associated Text", U.S. Appl. No. 15/616,555, filed Jun. 7, 2017.
List of IBM Patents or Patent Applications Treated as Related. Filed Jun. 8, 2017. 2 pages.

* cited by examiner

MODIFICATION OF IMAGES AND ASSOCIATED TEXT

BACKGROUND

The present invention relates generally to image editing and in particular to editing images with associated text for display in social networking applications.

With the prevalence of blogs, microblogs, and social networking sites on the Internet, the posting or otherwise sharing of images with associated text, such as captioned images, has become a widespread means of communication. In addition to captioned images, image files may further include descriptive metadata, such as tags or keywords, that can be used for both classifying and processing an image. However, only a user may know which parts of an image are desirable and what text should be accompanied with the image. Moreover, a system cannot classify or process an image without knowing a user's intent. Thus, the ability for a user to produce, process and edit images with associated text has become increasingly burdensome.

SUMMARY

A computer-implemented method includes receiving an image. The image includes one or more objects and one or more text portions. The computer-implemented method further includes identifying the one or more objects of the image. The computer-implemented method further includes, for each of the one or more objects identified, extracting an object tag. The computer-implemented method further includes, for each of the one or more text portions, extracting a text tag. The computer-implemented method further includes, for each text tag, determining whether the text tag describes any of the one or more objects based on the object tag extracted from each of the one or more objects to yield a determination. The computer-implemented method further includes, responsive to the determination, performing an image process to that of the one or more objects. The computer-implemented method further includes, responsive to the determination, performing a text process to that of the one or more text portions. A corresponding computer program product and computer system are also disclosed.

DETAILED DESCRIPTION

Figure 1:
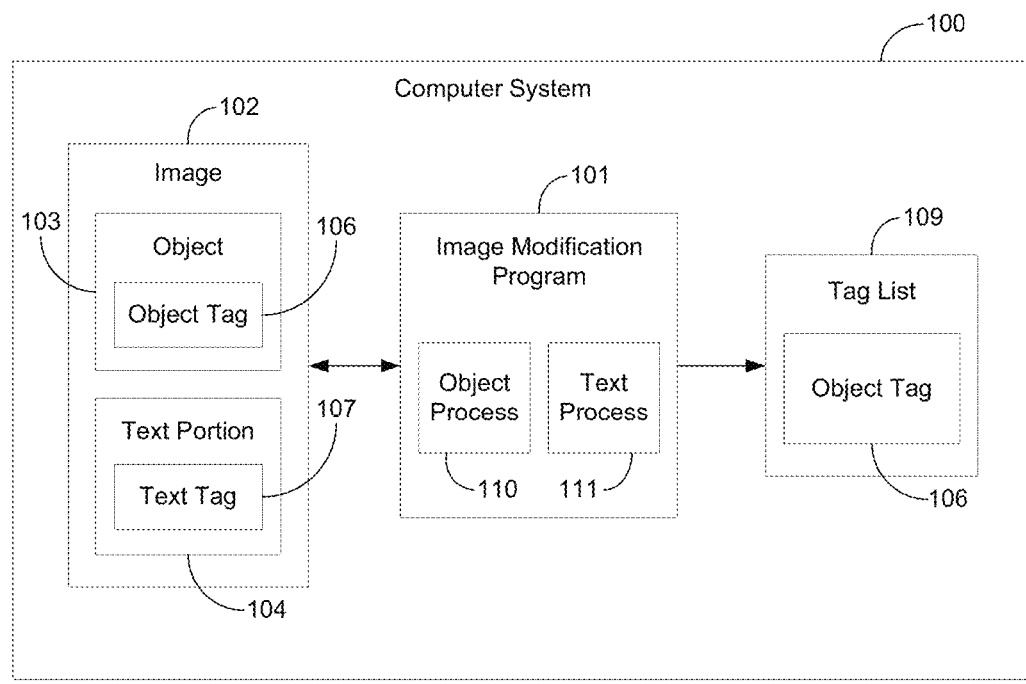
FIG. 1 is a block diagram of a computer system environment suitable for operation in accordance with at least one embodiment of the invention.

Referring now to various embodiments of the invention in more detail, FIG. 1 is a block diagram of a computer system environment suitable for operation in accordance with at least one embodiment of the invention. Within a computer system 100, an image modification program 101 may receive an image 102. The image 102 may include one or more objects 103 and one or more text portions 104. The image modification program 101 may further identify the one or more objects 103 of the image 102. The image modification program 101 may further, for each of the one or more objects 103 identified, extract an object tag 106. Each object tag 106 may be displayed together in tag list 109. The image modification program 101 may further, for each of the one or more text portions 104, extract a text tag 107.

The image modification program 101 may further, for each text tag 107, determine whether the text tag 107 describes any of the one or more objects 103 based on the object tag 106 extracted from each of the one or more objects 103 to yield a determination. In order to determine if a text tag 107 describes an object 103 of the image 102, each text tag 107 may be compared literally, semantically, and/or conceptually to each object tag 106. If the text tag 107 matches the object tag 106, it may be determined that the text tag 107 describes the object 103 of the image 102. Responsive to successfully determining that a text tag 107 describes any of the one or more objects 103, the object tag 106 extracted from the object 103 may be displayed with visual emphasis in the tag list 109.

The image modification program 101 may further, responsive to the determination, perform an object process 110 to that of the one or more objects 103 of the image 102. For example, an object process 110 may include removing or hiding one or more objects 103 of the image 102 using airbrushing, pixilation, mosaicking, trimming, or cropping techniques. Additionally, an image process 110 may include emphasizing one or more objects 103 of the image 102, for example, by a border. The image modification program 101 may further, responsive to the determination, perform a text process 111 to that of the one or more text portions 104 of the image 102. For example, a text process 111 may include modifying the format, i.e. font, color, underlining, bolding, or italicizing, of the one or more text portions 104 associated with the image 102.

Figure 2:
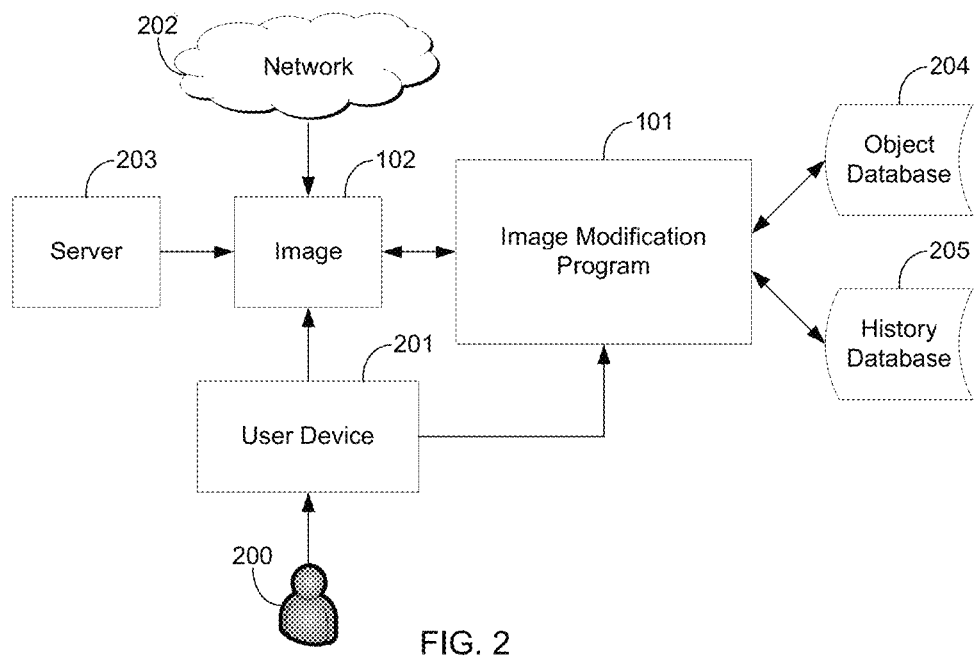
FIG. 2 is a network diagram of an operational environment suitable for operation in accordance with at least one embodiment of the invention.

FIG. 2 is a network diagram of an operational environment suitable for operation in accordance with at least one embodiment of the invention. In FIG. 2, the image modification program 101 may be in communication with a user 200 via a user device 201. More specifically, the image modification program 101 may receive an image 102 selected by a user 200. The image 102 may include one or more objects 103 and one or more text portions 104. The image 102 may be accessible by a user 200 via a number of environments, including a network 202, such as the Internet, locally stored data on a user device 201, such as a desktop computer or mobile device, or from a remote location, such as a server 203.

Additionally, the image modification program 101 may be in communication with an object database 204. The object database 204 may store contextual information about objects 103 found in images 102. For example, contextual information about an object 103 may include any meaning or context attached to an object by a group of people, such as all people, the population of a political or geographical region, a demographic group, or an interest group, such as photographers. The contextual information may be stored in the object database 204 in the form of a value indicating whether a user 200 would likely mask the object 103 in an image 102. Here, the image modification program 101 may communicate with the object database 204 to determine whether one or more objects 103 should be masked in the image 102 based on contextual information about similar or identical objects stored in the object database 204.

The image modification program 101 may further be in communication with a history database 205. The history database 205 may store selection data of each object 103 or object tag 106 from the tag list 109. Here, the image modification program 101 may communicate with the history database 205 to determine whether one or more objects 103 should be masked in the image 102 based on a user's 200 selection or non-selection of similar or identical objects stored in the history database 205.

In general, embodiments of the invention may transfer the image 102 to one or more environments, including a network 202, a user device 201, or a remote location, such as a server 203. Here, upon completion of an object process 110 or a text process 111, a user 200 may wish to save or share the image 102 with other people. More specifically, the image modification program 101 may transfer the image 102 to a remote location, such as a server 203 that can execute one or more services in connection with saving or sharing the image 102. For example, the server 203 may execute a social networking service ("SNS"), an email delivery service, a website production service, a file transfer service, a data storage service, a printing service, or a photo album production service.

Figure 3:
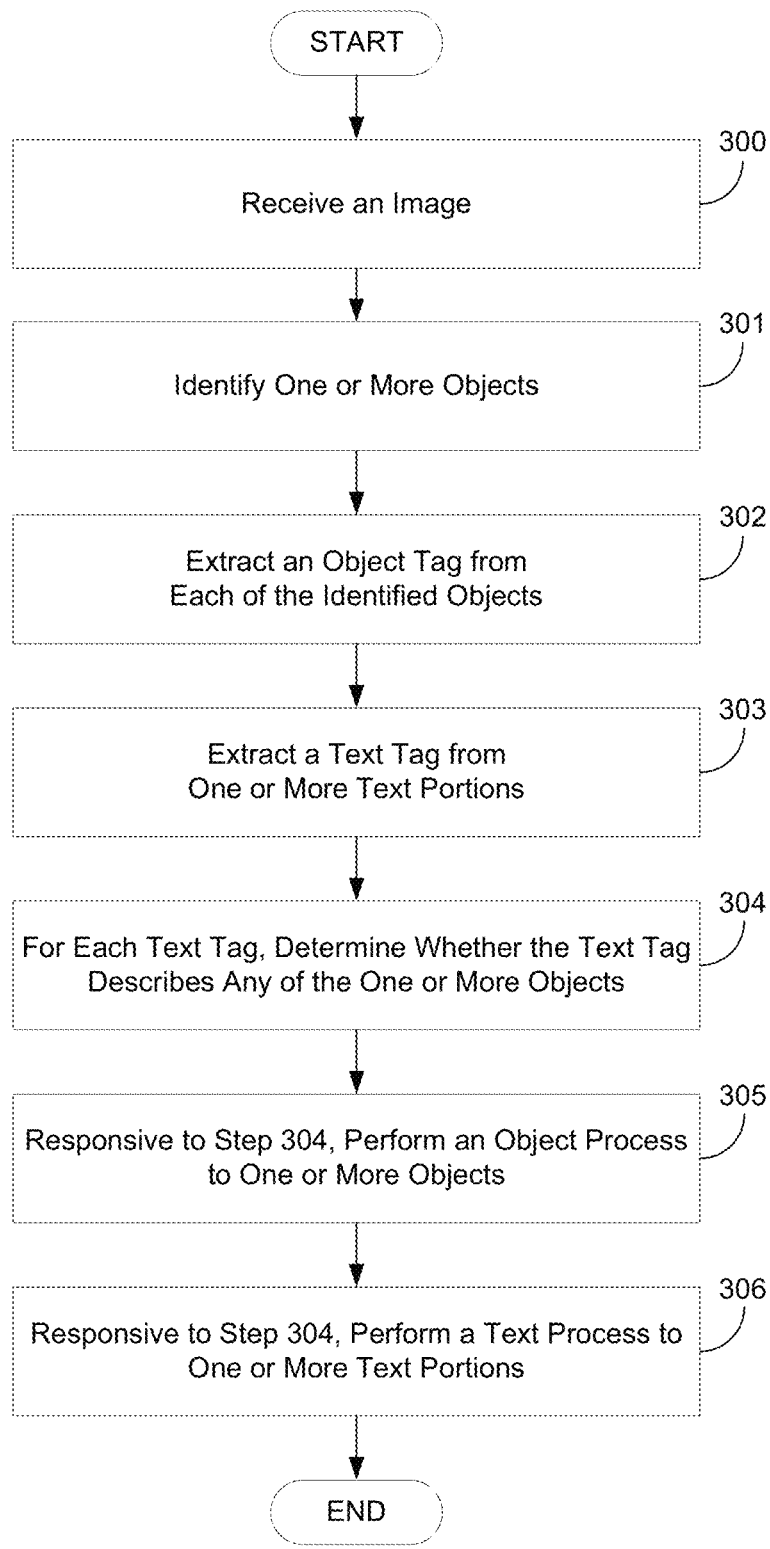
FIG. 3 is a flow chart diagram depicting operational steps for an image modification program 101 in accordance with at least one embodiment of the invention.

FIG. 3 is a flow chart diagram depicting operational steps for an image modification program in accordance with at least one embodiment of the invention. According to the depicted embodiment, at step 300, the image modification program 101 may receive an image 102. For example, the image 102 may be any digitally captured image, such as a photograph or scanned image. The image 102 may include one or more objects 103 and one or more text portions 104. More specifically, the one or more objects 103 may include any physical objects within the image 102, as well as metadata, such as one or more object tags 106. The one or more text portions 104 may include any preexisting text associated with the image 102, such as a caption, as well as metadata, such as one or more text tags 107.

At step 301, the image modification program 101 may identify one or more objects 103 of the image 102. An object 103 may be any portion of an image 102 that corresponds to a physical object, such as a building, person, tree, river or car, etc.; any portion of an image 102 corresponding to a part of a physical object, such as a face, hand, flower, or tire of a car, etc.; a portion of an image 102 corresponding to a set of physical objects, such as cherry blossoms, a traffic jam, or at garden, etc.; or, more generally, a portion of an image 102 corresponding to any visually observable phenomenon. The one or more objects 103 may be identified from the image 102 by any generally known identification methods, such as edge detection.

At step 302, the image modification program 101 may, for each of the one or more objects 103 identified, extract an object tag 106. Each object tag 106 may be displayed together in a tag list 109. An object tag 106 may be extracted from the one or more objects 103 by any generally known tag extraction methods, such as image recognition. Here, image recognition may be performed to determine, for example, what physical objects or categories of physical objects the one or more objects 103 correspond to in the real world. Furthermore, image recognition may be based on any generally known recognition methods, such as appearance-based methods or feature-based methods.

More specifically, an object tag 106 may be in the form of metadata that is representative of a word or phrase that describes or indicates the object or type of object. For example, if an object tag 106 that is representative of a "building" is extracted from the object 103 of the image 102, it can simply be assumed that the object tag "building" was extracted from the image 102. The object tag 106 may also be a name given to the object or type of object. Additionally, the object tag 106 may include information about the object 103 it corresponds to. For example, if an object tag "building" is extracted from the object 103 of the image 102, the object tag 106 may contain information about the position of one or more buildings in the image 102, such as (x, y) coordinates. Similarly, the object tag "building" may include information about the shape or size of the buildings. Furthermore, the object tag 106 may be assigned at varying degrees of abstraction, such as an upper level of abstraction. For example, an object tag "tree" may be extracted corresponding to the object "cherry blossoms" or an object tag "water" may be extracted corresponding to the object "river."

At step 303, the image modification program 101 may, for each of the one or more text portions 104, extract a text tag 107. A text tag 107 may be extracted by any generally known text extraction methods, such as natural language processing ("NLP"). For example, the image modification program 101 may separate a sentence into a plurality of words using any known morphological analysis method. The image modification program 101 may then assign a speech part to each of the separated words or group of words using any generally known syntactic analysis method. The image modification program 101 may further select one or more separated words or groups of words that are nouns and generate a text tag 107 for each word or groups of words, for example, by simply using the word or group of words as a text tag 107. Alternatively, a text tag 107 may be generated for a word or group of words, for example, by assigning a generic name to identify the word or group of words.

More specifically, a text tag 107 may be in the form of metadata that is representative of a word or phrase or representative of a word or phrase that otherwise corresponds to one or more text portions 104. Furthermore, a text tag 107 may be representative of a word or phrase that is synonymous with one or more text portions 104 or a concept having greater or less generality than one or more text portions 104.

At step 304, the image modification program 101 may, for each text tag 107, determine whether the text tag 107 describes any of the one or more objects 103 based on the object tag 106 extracted from each of the one or more objects 103 to yield a determination. In order to determine if a text tag 107 describes an object 103 of the image 102, each text tag 107 may be compared literally, semantically, and/or conceptually to each object tag 106. The image modification program 101 may use any generally known methods of comparison. For example, a conceptual dictionary, such as WordNet®, may be used to determine whether the concept underlying the text tag 107 matches the concept underlying the object tag 106. Responsive to successfully determining that a text tag 107 describes any of the one or more objects 103, the object tag 106 extracted from the object 103 may be displayed with visual emphasis in a tag list 109. An object tag 106 may be displayed with visual emphasis by any generally known means, such as bolding, italicizing, or underlining the object tag 106.

At step 305, responsive to the determination of step 304, the image modification program 101 may perform an object process 110 to that of the one or more objects 103 of the image 102. An image process 110 may be any generally known means of modifying the one or more objects 103 of the image 102. For example, if a text tag 107 is not matched to an object tag 106, the image modification program 101 may mask an object 103 in the image 102 by removing or hiding the object 103. In another example, if a text tag 107 is matched to an object tag 106, the image modification program 101 may emphasize the object 103 in the image 102. Other examples of an image process 110 may include drawing a border or shape around an object 103 of the image 102, or brightening or highlighting an object 103 of the image 102.

At step 306, responsive to the determination of step 304, the image modification program 101 may perform a text process 111 to the one or more text portions 104 associated with the image 102. A text process 111 may be any generally known means of modifying the one or more text portions 104 associated with the image 102. For example, if a text tag 107 is matched to an object tag 106, the image modification program 101 may change the formatting of the one or more text portions 104 by highlighting or bolding the one or more text portions 104 that correspond to the text tag 107. It should be appreciated that the previously mentioned object process 110 and text process 111 allow a user 200 who is reviewing one or more objects 103 or one or more text portions 104 associated with the image 102 to readily understand the relationship between the one or more objects 103 and one or more text portions 104 associated with the image 102.

In another embodiment of the invention, the image modification program 101 may, responsive to selecting at least one or more objects 103 or one or more object tags 106, perform an image process to the one or more objects 103 of the image 102. Here, selection of an object 103 or object tag 106 may also indicate a specific type of object process 110 or text process 111. Furthermore, a selection from the tag list 109 may designate the values of any selectable parameters of the indicated type of image process 110 or text process 111. For example, a user 200 may, through use of a mouse, select an object 103 of the image 102 or an object tag 106 from the tag list 109. Once either an object 103 or object tag 106 has been selected, the image modification program 101 may present an object process menu or a text process menu to the user 200.

For example, the object process menu or the text process menu may be displayed to the user 200 in the form of a pop-up window or panel, with subsequent menu selections. Here, a specific type of image process 110 or text process 111 may be accomplished by subsequent mouse clicks or keystrokes by a user 200. For example, the specific type of image process 110 or text process 111 may be airbrushing the one or more objects 103 of the image 102 or designating values of specific parameters associated with the image process 110 or text process 111. It should be appreciated that selection of an object 103 or object tag 106 may be accomplished by any generally known selection methods, such as mouse input, keyboard input, touchscreen input, eye tracking input, voice commands or gestures.

In another embodiment of the invention, the image modification program 101 may, responsive to selecting an object tag 106, perform a text process 111 to the one or more text portions 104 associated with the image 102. Selection of each object tag 106 may indicate a desired change to the one or more text portions 104 associated with the image 102. For example, if the image 102 includes preexisting text, the desired change may be to revise the preexisting text. In another example, if the image 102 does not include preexisting text, the desired change may be to create text from scratch or revise text that was created from scratch.

In another embodiment of the invention, the image modification program 101 may, responsive to selecting an object 103, perform a text process 111 to the one or more text portions 104 associated with the image 102. For example, if an object 103 of the image 102 is selected, the image modification program may generate one or more text portions 104 corresponding to the object 103.

Figure 4:
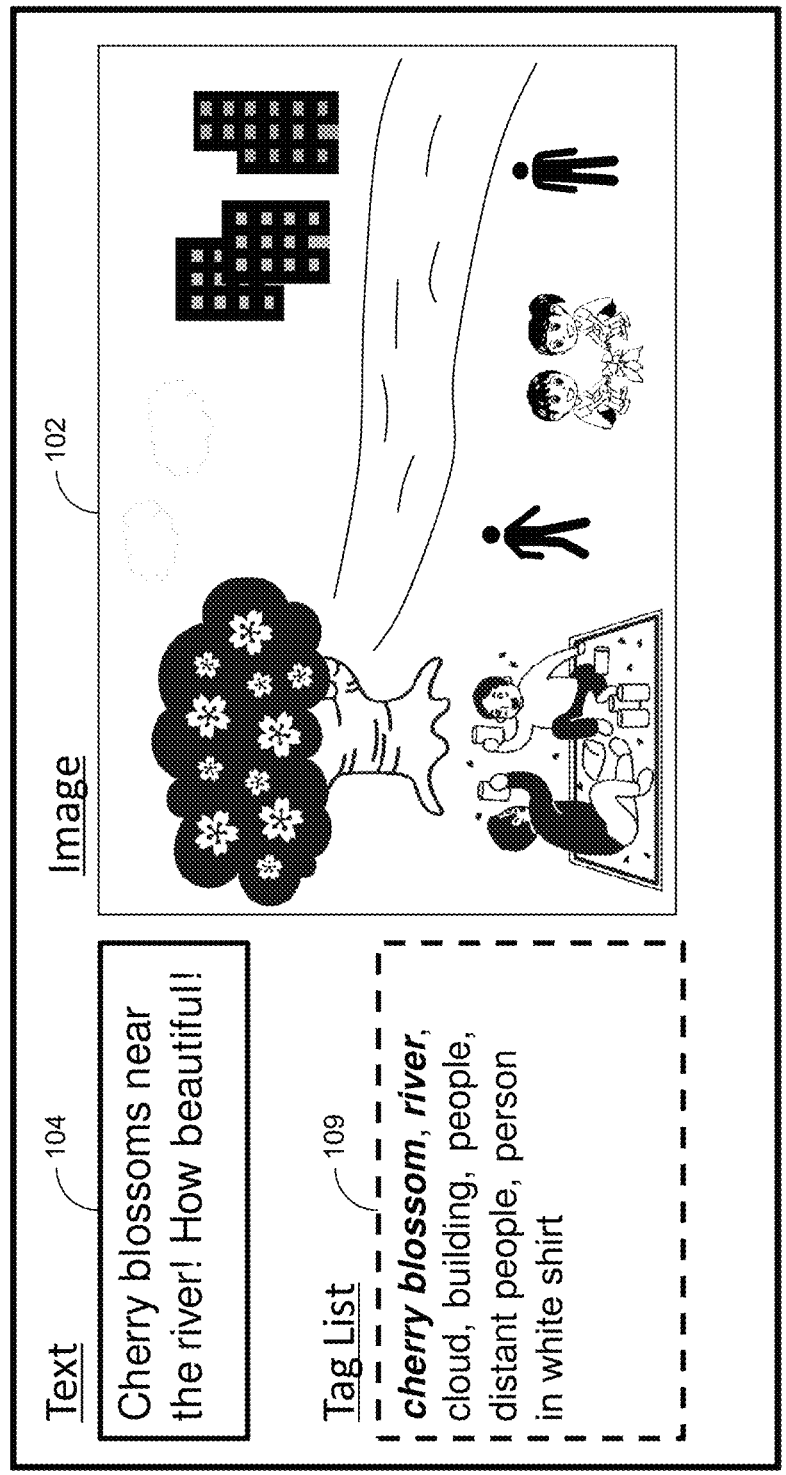
FIG. 4 is an exemplary diagram for a portion of a worked example of the image modification program 101 in accordance with at least one embodiment of the invention.

FIG. 4 is an exemplary diagram for a portion of a worked example of the image modification program 101 in accordance with at least one embodiment of the invention. In FIG. 4, a user 200 may have access to the image modification program 101 via a user device 201, such as a desktop computer, or a mobile device, such as a phone. The user 200 may be presented with a screen including regions for displaying the image 102, one or more text portions 104 ("Cherry blossoms near the river! How beautiful!"), and each object tag 106 displayed with visual emphasis ("cherry blossom" and "river") in a tag list 109.

In FIG. 4, the image modification program 101 may determine whether a text tag 107 describes any of the one or more objects 103 based on the object tag 106 extracted from each of the one or more objects 103 to yield a determination. For example, the image modification program 101 may extract the object tag "flower" from the image 102 by performing image recognition of the object "flower." Here, the image modification program 101 may determine that the text tag "cherry blossom" describes the object tag "flower." Since the text tag "cherry blossom" describes the object tag "flower", the image modification program 101 may generate an object tag 106 that is representative of both the text tag "cherry blossom" and the object tag "flower." In other words, the image modification program 101 may generate a single tag, e.g. only the object tag "cherry blossom," rather than both the object tags "cherry blossom" and "flower."

Responsive to successfully determining that a text tag 107 describes any of the one or more objects 103, the object tag 106 extracted from the object 103 may be displayed with visual emphasis in a tag list 109. As can be seen in FIG. 4, visual emphasis has been applied to the object tags "cherry blossom" and "river" by bolding and italicizing these words. In addition to determining whether a text tag 107 describes an object tag 106, the image modification program 101 may determine whether visual emphasis should be applied based on additional criteria.

The image modification program 101 may further determine whether each object tag 106 in the tag list 109 is in focus in the image 102. Here, the image modification program 101 may determine whether to give each object tag 106 visual emphasis based on whether the one or more objects 103 associated with each object tag 106 is in focus in the image 102. The determination of whether the one or more objects 103 are in focus in the image 102 is an additional means of determining the relevance of the one or more objects 103 of the image 102.

More specifically, the image modification program 101 may determine whether the one or more objects 103 are in focus by referring to metadata containing focus information in the image 102. When a photograph is taken by a camera, the lens of the camera may be adjusted to focus on a target object, either automatically or manually. The focus state at the time the image 102 is captured may be stored by the camera as focus information in the image 102. Such focus information can be, for example, in the form of coordinates of the target object in the image 102.

Figure 5:
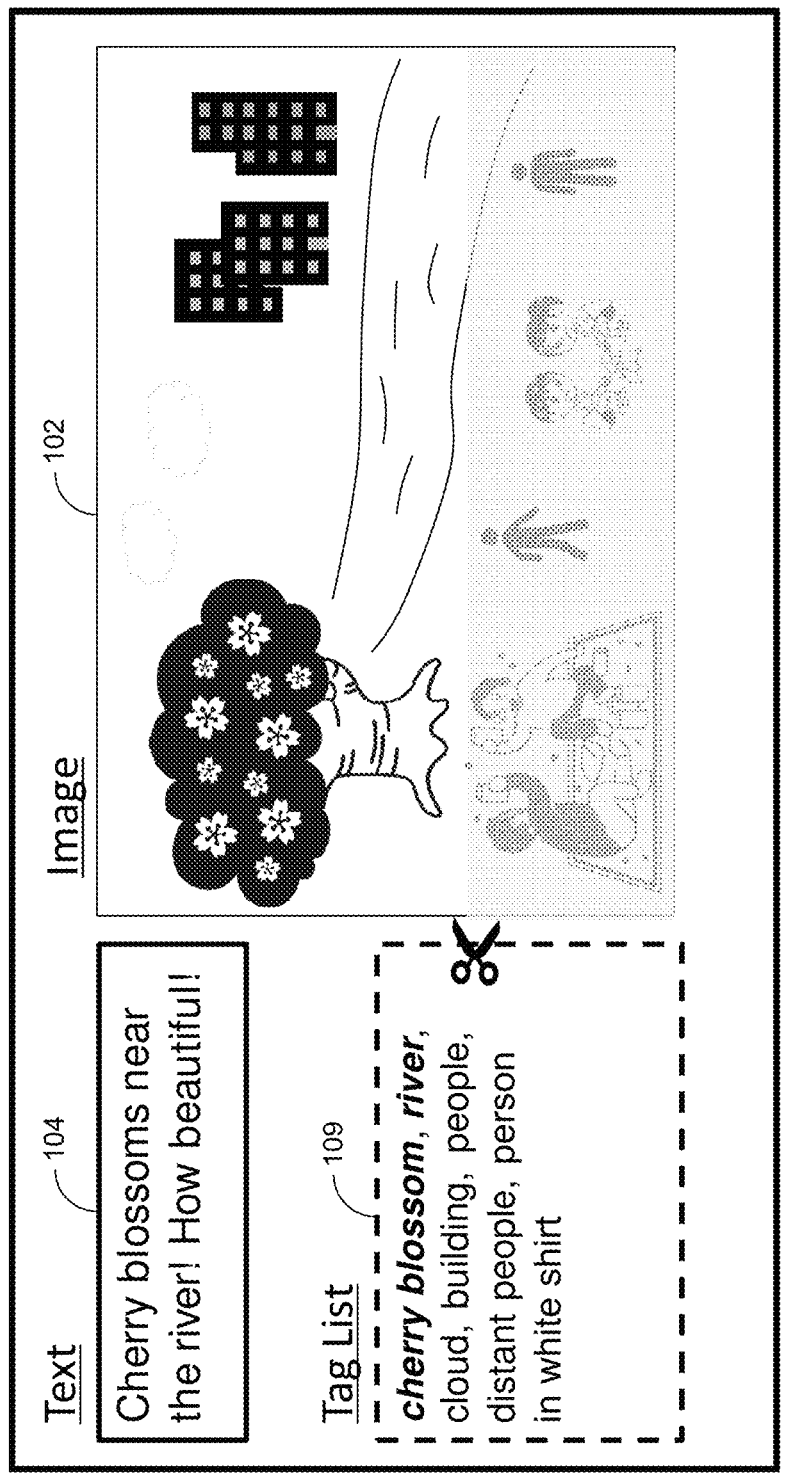
FIG. 5 is an exemplary diagram for a portion of a worked example of the image modification program 101 in accordance with at least one embodiment of the invention.

FIG. 5 is an exemplary diagram for a portion of a worked example of the image modification program 101 in accordance with at least one embodiment of the invention. FIG. 5 is identical to FIG. 4, except it additionally depicts the image process "trimming" of the lower portion of the image 102. For the purpose of FIG. 5, it can be assumed that each text tag 107 did not describe the objects "building," "people," "distant people," and "person in white shirt". As a result, it can be seen that the image modification program 101 has masked the unmatched objects of the image 102. Additionally, the image modification program 101 may trim or remove these one or more objects 103 from the image 102, unless such process would remove any of the one or more objects 103 described by each text tag 107 as well. Here, the image modification program 101 has left the objects "clouds" and "buildings" in the image 102 since their removal by trimming would cause the described objects "cherry blossoms" and "river" to be removed as well.

Figure 6:
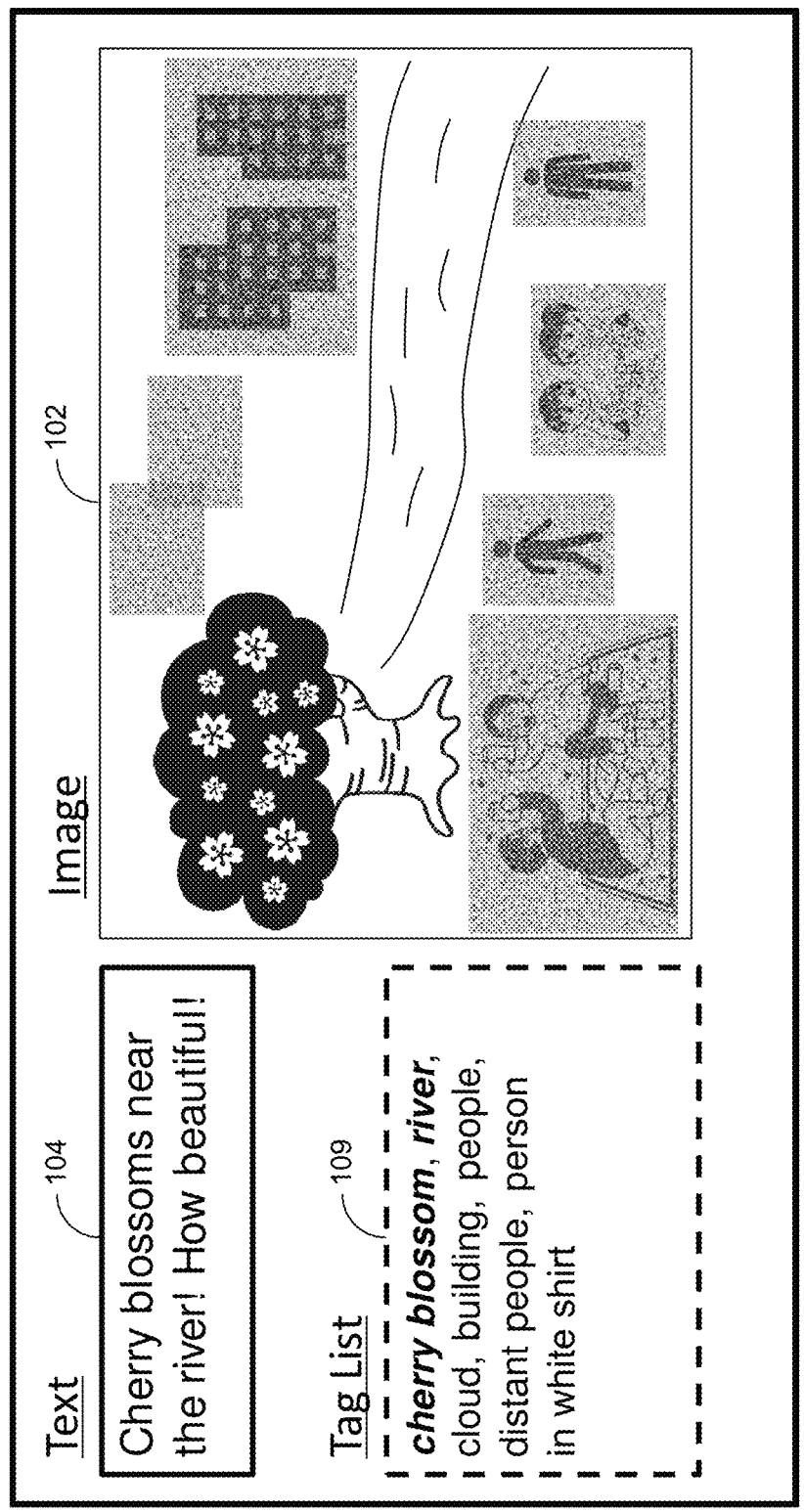
FIG. 6 is an exemplary diagram for a portion of a worked example of the image modification program 101 in accordance with at least one embodiment of the invention.

FIG. 6 is an exemplary diagram for a portion of a worked example of the image modification program 101 in accordance with at least one embodiment of the invention. FIG. 6 is identical to FIG. 5, except it depicts airbrushing of the one or more objects 103 instead of trimming of the lower portion of the image 102. In this way, the image modification program 101 may remove all of the one or more objects 103 not described by each text tag 107 without removing the objects "cherry blossoms" and "river" described by a text tag 107.

Figure 7:
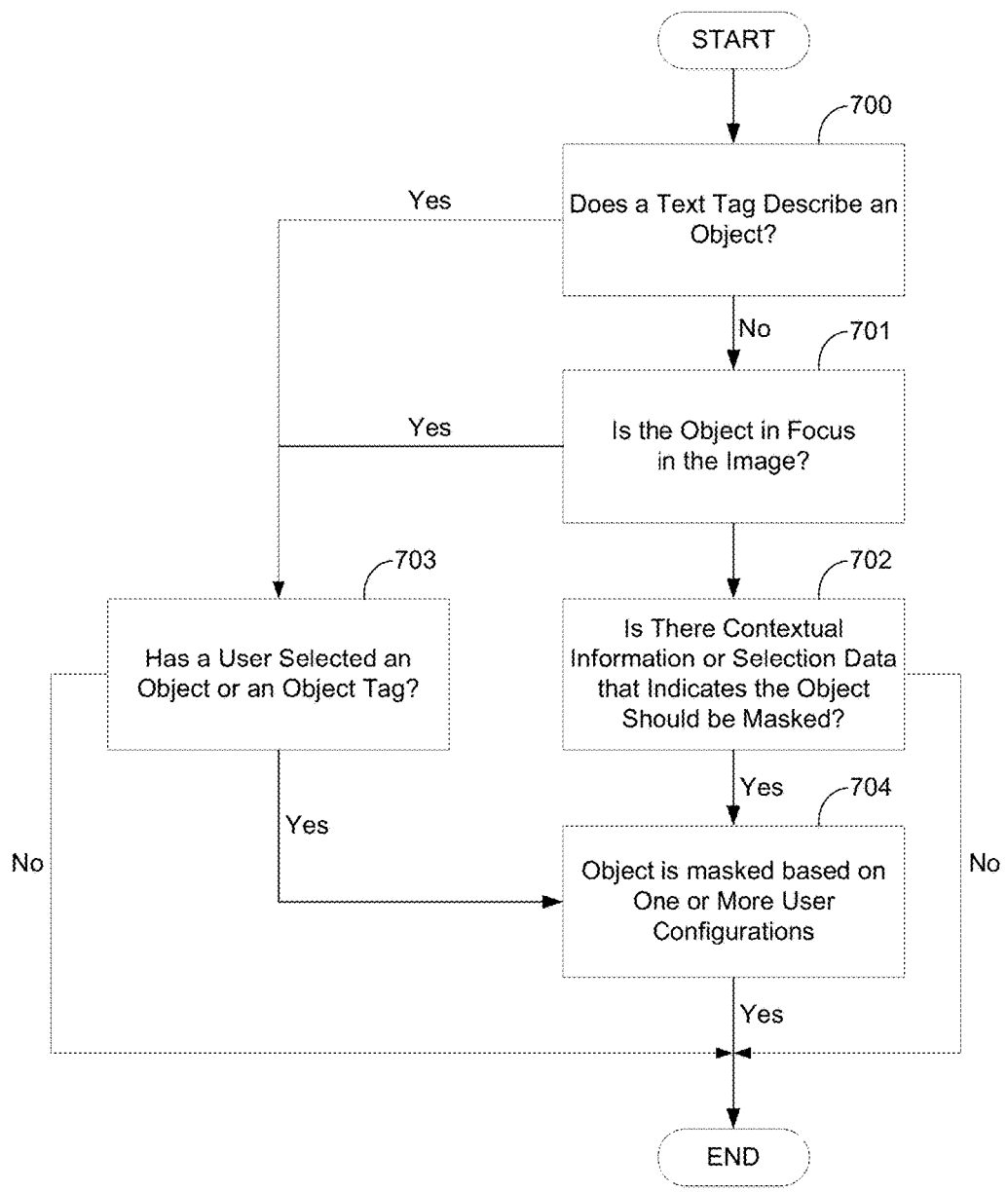
FIG. 7 is a flow chart diagram depicting operational steps for an object process 110 in accordance with at least one embodiment of the invention.

FIG. 7 is a flow chart diagram depicting operational steps for an object process 110 in accordance with at least one embodiment of the invention. At step 700, the image modification program 101 may perform an object process 110 on the image 102 responsive to determining whether a text tag 107 describes any of the one or more objects 103. If a text tag 107 describes an object 103, it may initially be assumed that the object 103 should not be masked in the image 102. On the other hand, if a text tag 107 does not describe an object 103, it may be initially assumed that the object 103 should be masked in the image 102.

At step 701, the image modification program 101 may also perform an object process 110 on an image 102 based on whether an object 103 is in focus in the image 102. For example, the image modification program 101 may refer to metadata containing focus information in the image 102. If the object 103 is in focus in the image 102, then it may be initially assumed that the object 103 should not be masked. On the other hand, if the object 103 is not in focus in the image 102, then it may be initially assumed that the object 103 should be masked.

At step 702, although an object 103 may be described by a text tag 107 and the object 103 is in focus, the image modification program 101 may determine whether a user 200 has selected an object 103 or object tag 106, thereby indicating to the image modification program 101 to perform masking of an object 103 of the image 102. The selection of an object 103 or object tag 106 may indicate, by default, that the object 103 should be masked in the image 102, such that a selection by a user 200 turns "OFF" the object 103 in the image 102. Alternatively, the selection of an object 103 or object tag 106 may indicate, by default, that the object 103 should not be masked in the image 102, such that a selection by a user 200 turns "ON" the object 103 in the image 102. In either case, whether the object 103 should or should not be masked may be specifically designated by a user 200 by selecting an object 103 or object tag 106.

At step 703, it can be assumed that the object 103 under consideration is neither described by a text tag 107 nor is in focus in the image 102. Thus, the initial assumption may be that the image modification program 101 should mask the object 103. However, before masking the object 103, the image modification program 101 may further refer to contextual information about the object 103 stored in an object database 204 or selection data stored in a history database 205. More specifically, the contextual information about the object 103 may indicate whether or not a user 200 would likely mask the object 103 and the selection data may indicate whether or not a user 200 has typically masked similar or identical objects.

For example, contextual information about people's faces may indicate that a user 200 would likely mask people's faces to protect the privacy of anonymous people. Thus, if an image 102 contains a face that is not recognized as a user's 200 friend, the image modification program 101 may determine that the face should be masked on the basis of such contextual information. On the other hand, in the case of the user's 200 friends, the selection data may indicate that a user 200 typically does not mask certain faces. Thus, on the basis of the contextual information and the selection data, the image modification program 101 may determine that certain known faces should not be masked, while other unknown faces should be masked.

At step 704, when considering contextual information or selection data, the image modification program 101 may determine whether the object 103 should be masked based on one or more user configurations. For example, the image modification program 101 may be configured to determine that the object 103 should be masked in the event that either the contextual information indicates that the user 200 would likely mask the object 103 or the selection data indicates that the user 200 typically masks similar or identical objects. In another example, the image modification program 101 may be configured to determine that the object 103 should be masked in the event that the contextual information fails to indicate that the user 200 would likely not mask the object 103 and the selection data fails to indicate that the user 200 typically masks similar or identical objects. Here, the image modification program 101 may mask an object 103 that is not described by a text tag 107 and is not in focus, absent some unusual circumstance.

In other configurations, the image modification program 101 may determine whether the object 103 should be masked by considering either contextual information or selection data. Here, if contextual information or selection data indicates that the object 103 should be masked, the initial assumption holds true and the object 103 is masked in the image 102. If not, then the object 103 is not masked.

As can be understood from FIG. 7, the image modification program 101 may be configured to determine whether an object 103 should be masked responsive to determining whether a text tag 107 describes an object 103. The image modification program 101 may also be configured to determine whether an object 103 should be masked on the basis of whether a user 200 has selected or not selected an object 103 or object tag 106. Furthermore, the image modification program 101 may be configured to determine whether an object 103 should be masked by considering contextual information about the object 103 stored in the object database 204 or selection data stored in the history database 205. It should be appreciated that the image modification program 101 may include any number of the previously mentioned configurations. Thus, since any of these configurations give an indication of an object's 103 relevance to a user 200, the image modification program 101 may fulfill a user's 200 intent with respect to editing an image 102 associated with one or more text portions 104.

Figure 8:
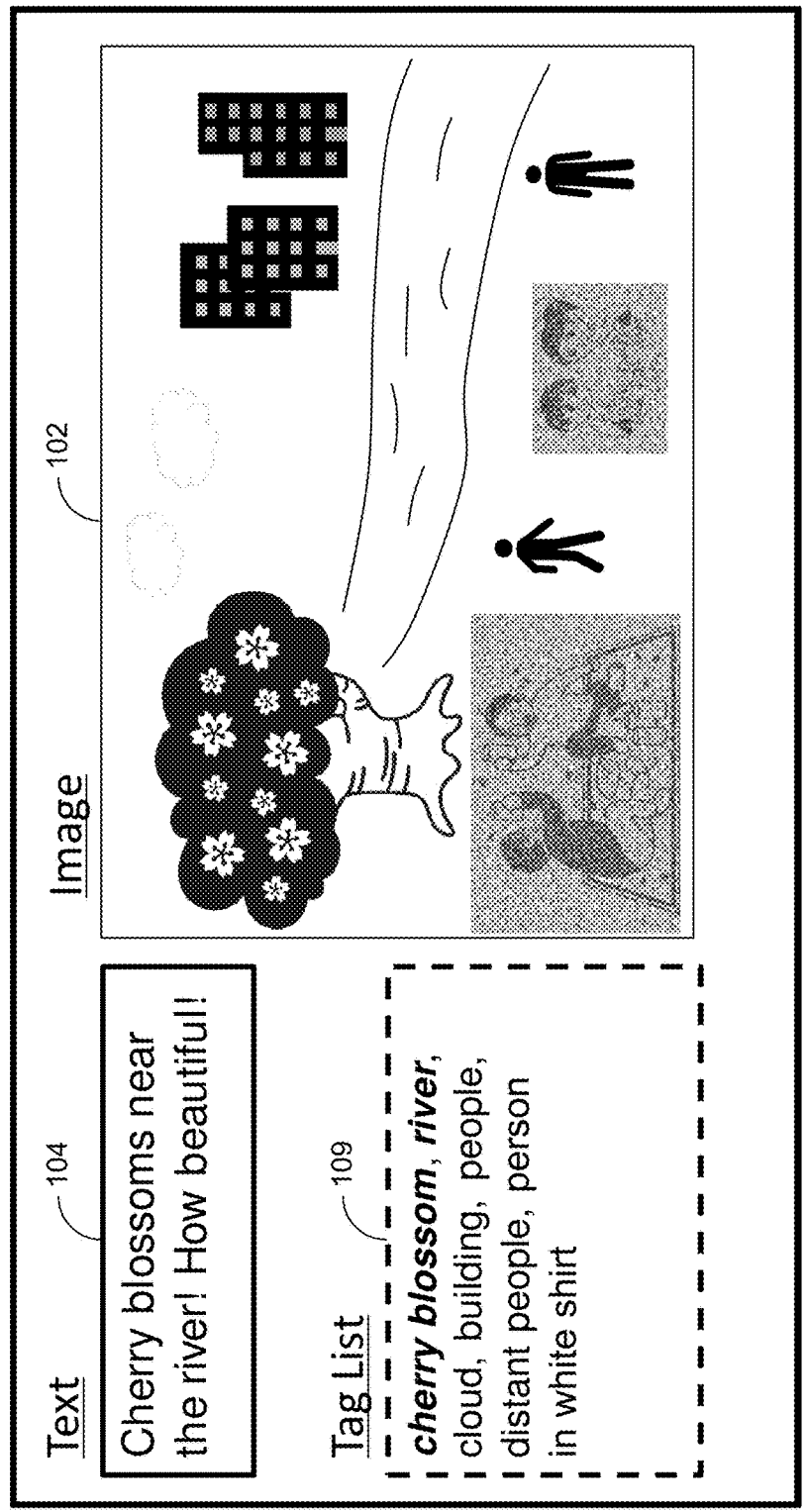
FIG. 8 is an exemplary diagram for a portion of a worked example of the image modification program 101 in accordance with at least one embodiment of the invention.

FIG. 8 is an exemplary diagram for a portion of a worked example of the image modification program 101 in accordance with at least one embodiment of the invention. In FIG. 8, the image modification program 101 has determined that, out of the undescribed objects, the objects "people" and "person in white shirt" should be masked. On the other hand, the image modification program 101 has determined that the objects "clouds," "buildings," and "distant people" should not be masked.

The decision not to mask the objects "clouds" and "buildings" illustrates how the image modification program 101 may refer to contextual information about each object 103. As previously explained above, the contextual information may include a meaning or context attached to an object 103 by a group of people (e.g. all people) and may indicate whether the user 200 would likely mask the object 103. In the case of the objects "clouds" and "buildings," it may be the case that these objects 103 are typically not masked in the user's 200 images 102. "Clouds" may be thought of as beautiful and may be considered to be an important part of the background of many images 102. "Buildings" may serve to define the location of the image 102. Furthermore, since they do not move, it may be rare that "buildings" are regarded as intruding on the intended subject of the image 102. Due to such considerations, the image modification program 101 has determined, on the basis of contextual information, that the user 200 would not likely mask the objects "clouds" or "buildings."

Meanwhile, the decision not to mask the object "distant people" illustrates how the image modification program 101 may refer to selection data from a history database 205 of the user's 200 past selection of an object 103 or object tag 106. The history database 205 may have one or more entries indicating either that the user 200 made a selection identical to or similar to "distant people" in the past or did not make a selection identical to or similar to "distant people" in the past. Here, the image modification program 101 has determined, on the basis of the selection data, that the user 200 typically does not mask the object "distant people."

Figure 9:
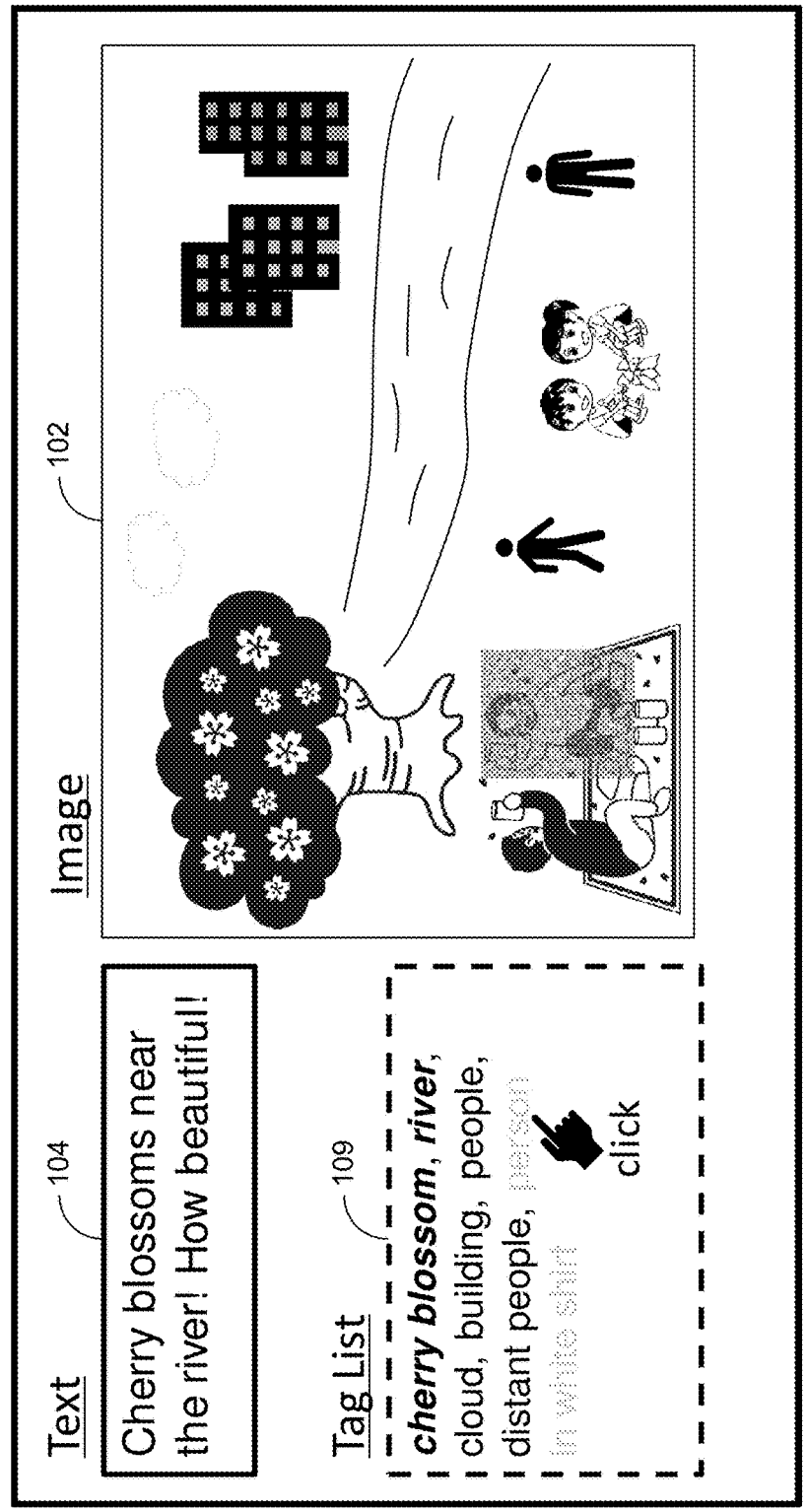
FIG. 9 is an exemplary diagram for a portion of a worked example of the image modification program 101 in accordance with at least one embodiment of the invention.

FIG. 9 is an exemplary diagram for a portion of a worked example of the image modification program 101 in accordance with at least one embodiment of the invention. In FIG. 9, a user 200 has selected the object tag "person in white shirt" by clicking on it in the tag list 109. By selecting the object tag "person in white shirt," the user 200 has indicated that the image modification program 101 should perform masking by way of airbrushing the object "person in white shirt" in the image 102. Here, the designation to mask by way of airbrushing has been defaulted, such that the selection of the object tag "person in white shirt" simply turns OFF (i.e. masks) the corresponding object 103 in the image 102.

Figure 10:
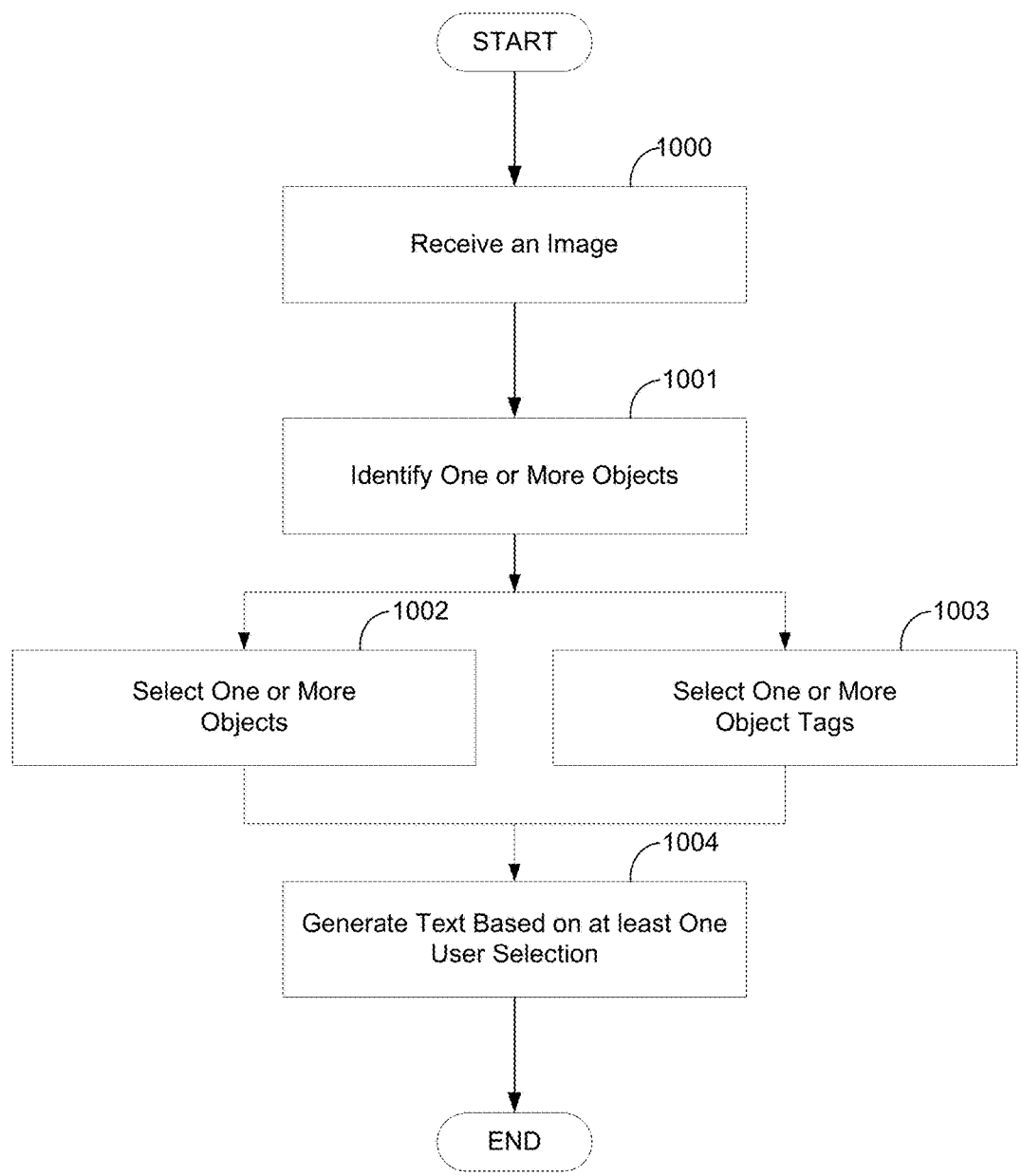
FIG. 10 is a flow chart diagram depicting operational steps for an image modification program 101 in accordance with at least one embodiment of the invention.

FIG. 10 is a flow chart diagram depicting operational steps for an image modification program 101 in accordance with at least one embodiment of the invention. At step 1000, the image modification program 101 may receive an image 102. The image 102 may include one or more objects 103 and one or more text portions 104. At step 1001, the image modification program 101 may identify one or more objects 103 of the image 102. At step 1002, a user 200 may select one or more objects 103 identified in the image 102. At step 1003, a user 200 may select one or more object tags 106 from the tag list 109.

At step 1004, the image modification program 101 may perform a text process, wherein the text process may include generating text based on at least one user selection from one or more objects 103 or one or more object tags 106. The text may be generated using any generally known heuristics or message templates. For example, the image modification program 101 may, on the basis of selecting an object 103 in the image 102, generate text associated with the object 103. Selection of an object 103 of the image 102 may further indicate for the image modification program 101 to generate a specific tone of text. For example, selection of an object 103 of the image 102 may prompt the user 200 to make further selections from a drop-down menu including different formatting options for the generated text.

Additionally, a user selection from one or more objects 103 or one or more object tags 106 may indicate an assignment of a speech part to each object 103 based on a selection sequence. For example, a user 200 may wish to designate that an object 103 should serve as the grammatical subject of the text while another object 103 should serve as the direct object. Here, the image modification program 101 may generate the text in a way that more accurately reflects the user's 200 intent. For example, in the case where a user 200 makes a selection of a sequence of object tags 106 from the tag list 109, the order of each object tag 106 selected may determine the assignment of a speech part to each portion of the text to be generated corresponding to each object 103. Similarly, in the case where a user 200 makes a selection of a sequence of visible regions surrounding objects 103 in the image 102, the order of each object 103 selected may determine the assignment of a speech part to each portion of the text to be generated corresponding to each object 103 selected.

Furthermore, the image modification program 101 may generate text based on the position, size, or contextual information about the one or more objects 103 of the image 102. For example, if one or more objects 103 are selected, some of which are in close proximity with each other, the image modification program 101 may associate the word "near" with those objects 103 that are in close proximity with each other.

Similarly, the contextual information stored in the object database 204 may include a meaning or context attached to an object 103 as explained above, which can also be taken into consideration by the image modification program 101. For example, contextual information about an object "tree" might include information about its typical size. With such information, combined with information about the size of a "tree" in the image 102, the image modification program 101 may associate the word "big" with the word "tree."

Figure 11:
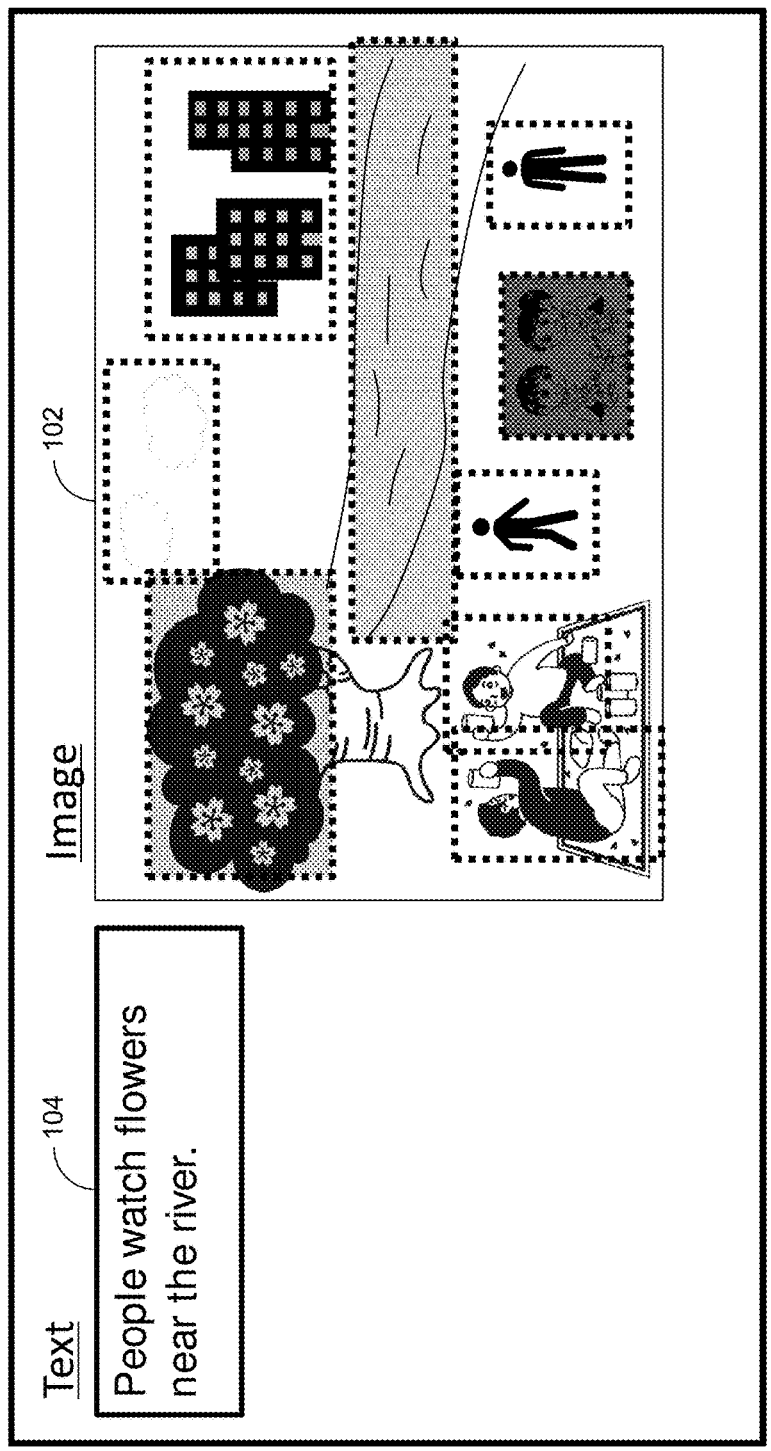
FIG. 11 is an exemplary diagram for a portion of a worked example of the image modification program 101 in accordance with at least one embodiment of the invention.

FIG. 11 is an exemplary diagram for a portion of a worked example of the image modification program 101 in accordance with at least one embodiment of the invention. In FIG. 11, an image 102, one or more text portions 104 ("People watch flowers near the river"), and a tag list 109 can be seen. Here, a user 200 has selected the object tags "river," "flower," and "people" from the tag list 109. Furthermore, the user 200 has indicated that "people" should serve as the grammatical subject of the text to be generated. For example, the user 200 may have clicked, with a mouse, the object tag "people" first, followed by the object tags "river" and "flower" in any subsequent order. Based on the selection order by the user 200, the image modification program 101 has generated the text "People watch flowers near the river" in accordance with the assignment of "people" as the grammatical subject.

Figure 12:
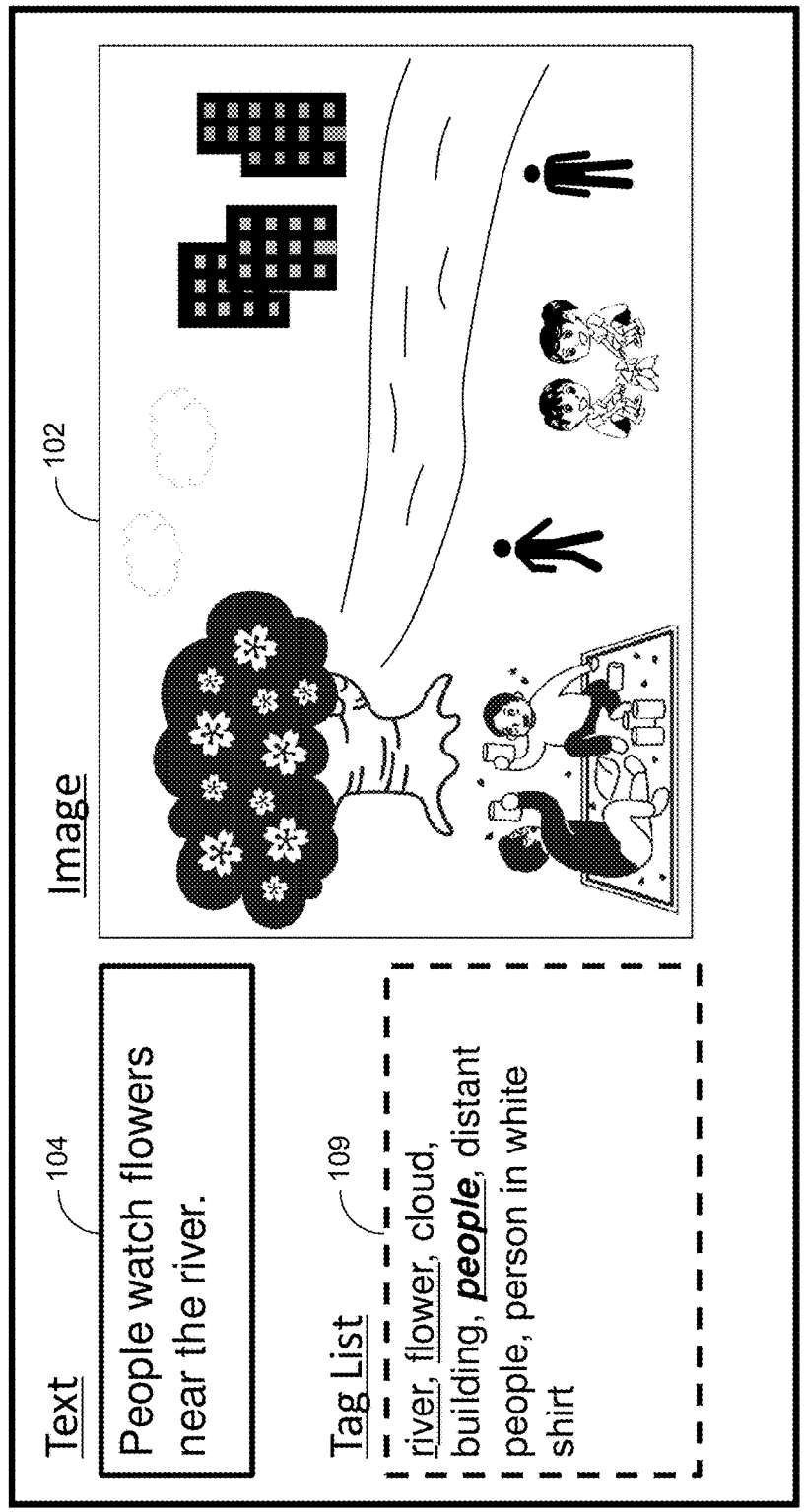
FIG. 12 is an exemplary diagram for a portion of a worked example of the image modification program 101 in accordance with at least one embodiment of the invention.

FIG. 12 is an exemplary diagram for a portion of a worked example of the image modification program 101 in accordance with at least one embodiment of the invention. In FIG. 12, no tag list 109 is depicted and boxes have been drawn surrounding each of the objects 103 identified by the image modification program 101. Here, a user 200 has selected the objects "river," "flower," and "people" in the image 102 through a sequence of selections. Furthermore, the user 200 has indicated that "people" should serve as the grammatical subject of the text to be generated. For example, the user 200 may have clicked, with a mouse, the box surrounding the object "people" first, followed by the boxes surrounding the objects "river" and "flowers" in any subsequent order. Based on the selection order by the user 200, the image modification program 101 has generated the text "People watch flowers near the river" in accordance with the assignment of "people" as the grammatical subject.

Referring now to both FIGS. 11 and 12, the image modification program 101 may have generated the words "watch" and "near" based on the position of the selected objects, the size of the selected objects, or contextual information about the selected objects stored in the object database 204. For example, the "nearness" of the object "people" to the object "river" may have been generated by the image modification program 101 based on proximity information derived from position or size of the objects 103. Similarly, the verb "watch" may have been generated by the image modification program 101 based on contextual information about "flowers" or "people." Such contextual information about the objects 103 may indicate that a user 200 often includes the verb "watch" between "people" and "flowers."

Figure 13:
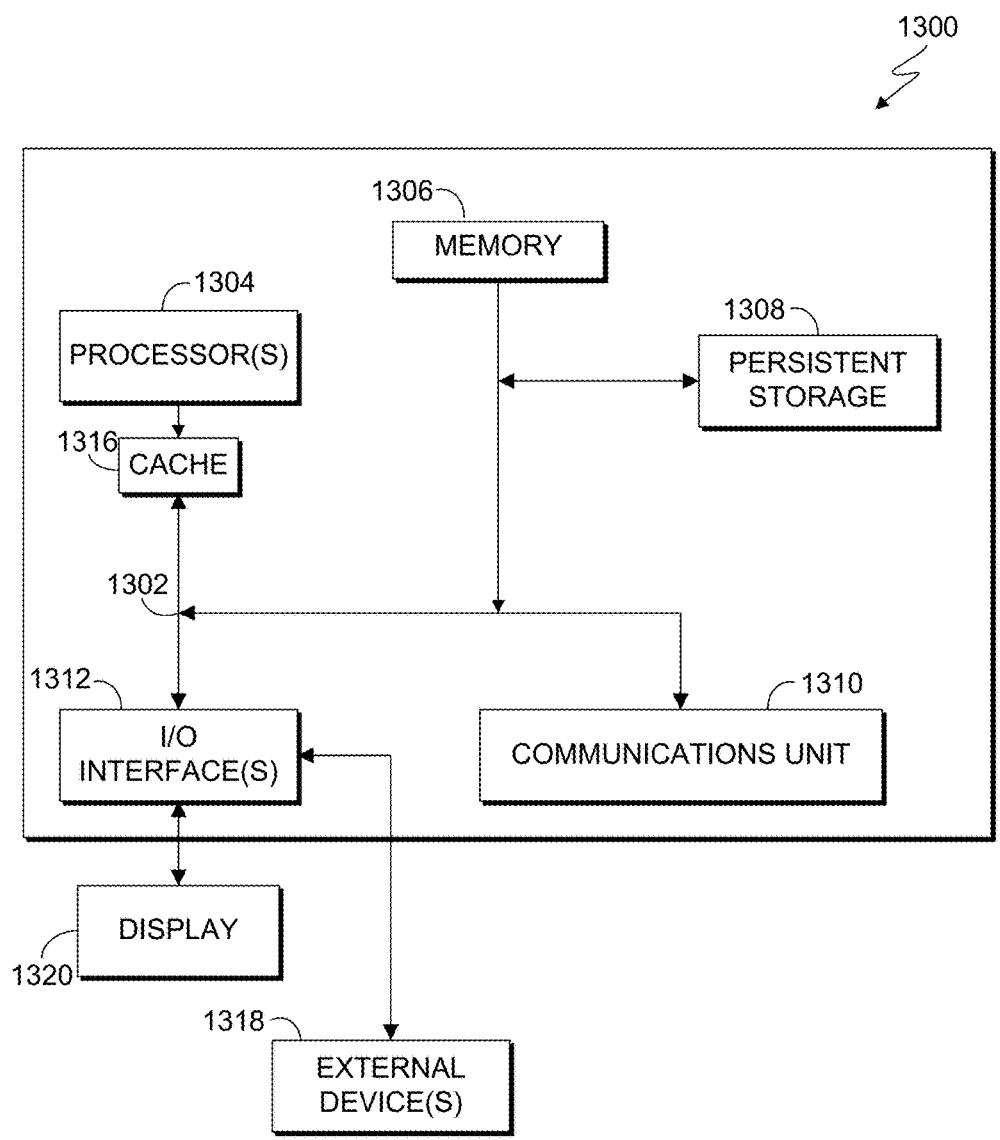
FIG. 13 is a block diagram of a computing apparatus 1300 suitable for executing the image modification program 101 in accordance with at least one embodiment of the invention.

FIG. 13 is a block diagram of a computing apparatus 1300 suitable for executing the image modification program 101 in accordance with at least one embodiment of the invention. FIG. 8 displays the computer 1300, the one or more processor(s) 1304 (including one or more computer processors), the communications fabric 1302, the memory 1306, the RAM, the cache 1318, the persistent storage 1308, the communications unit 1312, the I/O interfaces 1314, the display 1322, and the external devices 1320. It should be appreciated that FIG. 13 provides only an illustration of one embodiment and does not imply any limitations with regard to the environments in which different embodiments may be implemented. Many modifications to the depicted environment may be made.

As depicted, the computer 1300 operates over a communications fabric 1302, which provides communications between the computer processor(s) 1304, memory 1306, persistent storage 1308, communications unit 1312, and input/output (I/O) interface(s) 1314. The communications fabric 1302 may be implemented with any architecture suitable for passing data or control information between the processors 1304 (e.g. microprocessors, communications processors, and network processors), the memory 1306, the external devices 1320, and any other hardware components within a system. For example, the communications fabric 1302 may be implemented with one or more buses.

The memory 1306 and persistent storage 1308 are computer readable storage media. In the depicted embodiment, the memory 1306 comprises a random access memory (RAM) and a cache 1318. In general, the memory 1306 may comprise any suitable volatile or non-volatile one or more computer readable storage media.

Program instructions for the image modification program 101 may be stored in the persistent storage 1308, or more generally, any computer readable storage media, for execution by one or more of the respective computer processors 1304 via one or more memories of the memory 1306. The persistent storage 1308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 1308 may also be removable. For example, a removable hard drive may be used for persistent storage 1308. Other examples include optical and magnetic disks, thumb drives, and smart cards that are inserted into a drive for transfer onto another computer readable storage medium that is also part of the persistent storage 1308.

The communications unit 1312, in these examples, provides for communications with other data processing systems or devices. In these examples, the communications unit 1312 may comprise one or more network interface cards. The communications unit 1312 may provide communications through the use of either or both physical and wireless communications links. In the context of some embodiments of the present invention, the source of the source of the various input data may be physically remote to the computer 1300 such that the input data may be received and the output similarly transmitted via the communications unit 1312.

The I/O interface(s) 1314 allow for input and output of data with other devices that may operate in conjunction with the computer 1300. For example, the I/O interface 1314 may provide a connection to the external devices 1320, which may be as a keyboard, keypad, a touch screen, or other suitable input devices. External devices 1320 may also include portable computer readable storage media, for example thumb drives, portable optical or magnetic disks, and memory cards. Software and data used to practice embodiments of the present invention may be stored on such portable computer readable storage media and may be loaded onto the persistent storage 1308 via the I/O interface(s) 1314. The I/O interface(s) 1314 may similarly connect to a display 1322. The display 1322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   performing a text process to an image, wherein the text process comprises:
   assigning a type of speech part to one or more objects included in an image, wherein said type of speech part assigned to each of said one or more objects is based, at least in part, on a selection sequence of said one or more objects; and
   generating text corresponding to each of said one or more objects selected based, at least in part, on said type of speech part assigned to each of said one or more objects.

2. The computer-implemented method of claim 1, wherein generating text corresponding to each of said one or more objects selected is further based on contextual information associated with each of said one or more objects.

3. The computer-implemented method of claim 1, further comprising:
   identifying said one or more objects included in said image; and
   extracting an object tag for each object of said one or more objects.

4. The computer-implemented method of claim 3, wherein generating text corresponding to each of said one or more objects selected is further based on said object tag extracted for each object.

5. The computer-implemented method of claim 3, wherein each object tag extracted for said one or more objects is displayed in a tag list.

6. The computer-implemented method of claim 5, further comprising performing a first image process on a first object included in said image based, at least in part, on a selection of a first object tag displayed in said tag list.

7. The computer-implemented method of claim 1, further comprising performing a second image process on a second object included in said image based, at least in part, on a selection of said second object.

8. The computer-implemented method of claim 7, wherein performing said second image process is further based, at least in part, on contextual information associated with said second object.

9. The computer-implemented method of claim 7, wherein performing said second image process is further based, at least in part, on historical selection data associated with said second object.

* * * * *